H. F. WOODMANCY.

SPINDLE SUPPORT.

No. 11,407. Reissued Mar. 20, 1894.

WITNESSES:

Henry J. Miller

Chas. H. Luther Jr

INVENTOR:

Henry F. Woodmancy by Joseph A. Miller & Co.

Attys.

UNITED STATES PATENT OFFICE.

HENRY F. WOODMANCY, OF WHITINSVILLE, MASSACHUSETTS, ASSIGNOR TO THE WHITIN MACHINE WORKS, INCORPORATED, OF SAME PLACE.

SPINDLE-SUPPORT.

SPECIFICATION forming part of Reissued Letters Patent No. 11,407, dated March 20, 1894.

Original No. 480,985, dated August 16, 1892. Application for reissue filed September 7, 1893. Serial No. 485,026.

*To all whom it may concern:*

Be it known that I, HENRY F. WOODMANCY, of Whitinsville, in the county of Worcester and State of Massachusetts, have invented certain new and useful Improvements in Spindle-Supports; and I hereby declare that the following is a full, clear, and exact description of the same, reference being had to the accompanying drawings, forming part of this specification.

This invention has reference to improvements in supports for spindles of spinning-machines.

The object of the invention is to produce a support for spindles in which the doffer-guard, while holding the spindle in place during the removal of a bobbin, may be readily operated to allow the removal from the bolster and case of the spindle, whirl and sleeve.

Another object of the invention is to produce a spindle-support provided with a doffer-guard which may be automatically operated by the whirl to allow the insertion of the spindle in the bolster and to lock the same in place.

The further object of the invention is to produce a spindle-support having a rigid arm, closely approaching the circumference of the whirl, by which the driving-band is prevented from slipping off the whirl.

The invention consists in certain peculiar features of construction and combination of novel parts which will hereinafter be more fully described and pointed out in the claims.

Figure 1:
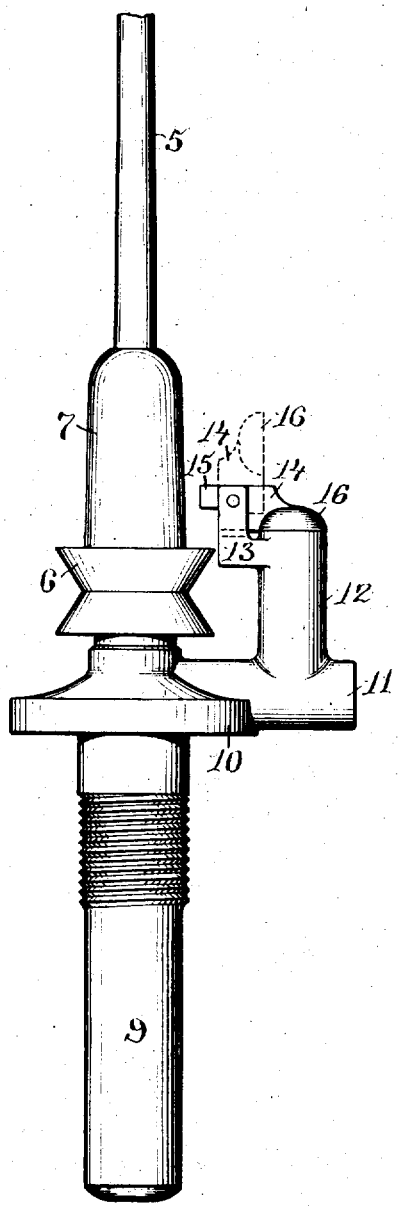
Figure 2:
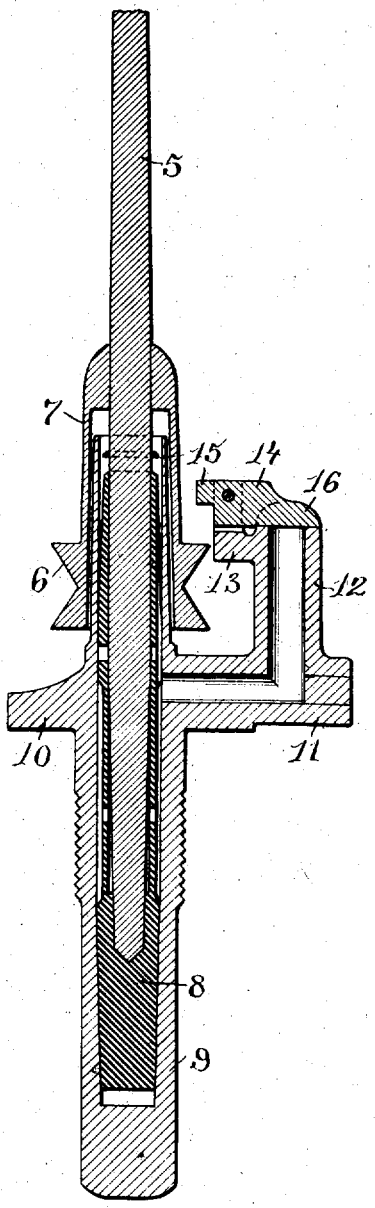

Figure 1 represents a view of the improved spindle-support, formed in part with a bolster-case, and the doffer-guard pivotally secured thereto. Fig. 2 represents a vertical sectional view of the same to more clearly show the improved construction.

Similar numbers of reference designate corresponding parts throughout.

In the drawings 5 indicates a spindle of the usual form provided with the whirl 6 and sleeve 7; the lower or bearing end of the spindle is contained within the bolster-bearing 8 which in turn is held within the bolster-case 9. The bolster-case is provided on a portion of its outer surface with a screw-thread by which it is secured in a perforation of the bolster-rail. Above this threaded portion is formed a flange 10 extending from one side of which is a hollow-arm 11, closed at the outer end, having the vertical hollow-post 12, and at the upper portion of this post and formed in part therewith is the inwardly-extending bracket 13. This bracket may extend inward sufficiently to just clear the edge of the whirl 6 and has upwardly-projecting ears between which is pivoted the arm 14 having the inward-projection 16 to form the doffer-guard and on its outer end the counter-weight 16 shaped to serve as a cap, or cover, for the open end of the post 12. The perforation of the vertical post 12 and the arm 11 being continuous from the upper end of the post to the interior of the bolster-case serves as a reservoir for the lubricant which may enter the bolster-case and, through suitable openings in the bolster, is admitted to the spindle-bearing.

When a bobbin is placed on the spindle its lower inner surface is engaged by the whirl-sleeve 7, which prevents the bobbin from being pushed down sufficiently to be caught by the doffer-guard. On removing or doffing the bobbin from the spindle after being filled, the engagement of the bobbin with the whirl-sleeve tends to lift the spindle and whirl from the bolster, but after a slight upward movement the whirl 6 comes in contact with the doffer-guard 15 and further upward movement is prevented, the bobbin is drawn off from the spindle and the spindle and whirl fall back into place. If the spindle is to be removed from the bolster, by simply lifting the weighted end of the pivoted doffer-guard, as is shown in dotted lines in Fig. 1, the obstruction is removed. When released the counterweight immediately falls back into place and again sets the doffer-guard.

An important feature of this invention is the ease and rapidity with which the spindles may be inserted in place and the oiling-tube covered, requiring no attention in turning the doffer-guard as at present, the simple insertion of the spindle being sufficient, the doffer-guards opening automatically as the whirl passes them and immediately closing after the whirl has passed. The spindle can be supplied with oil while running, as the hinged doffer-guard can be lifted off the oiling-tube without interfering with the whirl.

while the constant use of the doffer-guard affords an assurance that the entrance to the oil-duct will be always covered by the counterweight, except when the duct is being supplied with oil, thus preventing the admission of lint or dust to the reservoir.

The doffing, or removing, of the bobbin from the spindle takes place many times each day and as the doffer-guard must, during this operation, be in position to prevent the undue lifting of the spindle, it (the doffer-guard) becomes a detector to indicate the position of the reservoir cover formed by the counterweight, the reservoir being necessarily covered when the doffer-guard is in position to prevent the undue lifting of the spindle. If, during the doffing, the spindle be lifted with the bobbin, the operator will thus be notified that the cover of the reservoir is raised and may then close the same.

Having thus described my invention, I claim as new and desire to secure by Letters Patent—

1. In a spindle support the combination of a rigid post extending outside of and above the whirl, a lever pivoted near the upper end of said post and having one end weighted, the other end extending toward the spindle, the whole adapted to form a stop for the whirl in its normal position and an open passage for the whirl when the weighted end of the lever is raised.

2. In a support for spindles, a doffer-guard, consisting of a support outside of and above the whirl and a lever pivoted thereon near its inner end and having the outer end weighted, the whole adapted to form a stop for the whirl in its normal position and an open passage for the whirl when the weighted end of the lever is raised, as described.

3. A spindle-support having a rigid vertical post on one side beyond and above the driving-whirl, a bracket extending from the post toward the spindle, and a hinged lever pivoted near its inner end, having the outer end weighted, the whole adapted to form a stop for the whirl in its normal position and open a passage for the whirl when the weighted end of the lever is raised, as described.

4. In a support for spindles, consisting of the bolster-case 9, having the usual oil-chamber, the laterally-extending hollow-arm 11 and vertical hollow post 12 forming a communication with the interior of the bolster-case, the combination therewith of a combined doffer-guard and oil-duct cover, pivoted to the upper portion of said post having one end extending toward the spindle, and the outer part covering the opening of the hollow post 12, as described.

5. In a support for spindles, consisting of the bolster-case 9 having the usual oil-chamber, the laterally-extending hollow-arm 11 and vertical hollow post 12 forming extensions of the oil-chamber, the combination therewith of a doffer-guard pivoted to the upper end of said post 12 and having a counter-weight adapted to serve as a cover for the open end of the post, as described.

6. The combination, with a spindle, a sleeve-whirl secured to the spindle, and a bolster-case, closed at the bottom, adapted to be secured to a bolster-rail provided with a tube extending upward within the sleeve-whirl and having an interior oil-chamber, of the hollow-arm 11 extending laterally beyond the whirl, the vertical hollow post 12 forming with the hollow arm an inlet to the oil-chamber in the bolster-case, the bracket 13 extending inward toward the spindle above the whirl when the same is in its normal position, and the arm 14 pivoted to said bracket and having the doffer-guard 15 and counter-weight 16, as and for the purpose described.

7. In a spindle support, in combination with a bolster-case forming an oil-reservoir and laterally-projecting oil-duct, and a sleeve-whirl spindle, a combined doffer-guard and cover for the oil-duct, pivotally supported upon a support therefor in such proximity to the oil-duct that the setting of the doffer-guard automatically sets the cover of the opening of the oil-duct.

HENRY F. WOODMANCY.

Witnesses:
C. A. TAFT,
HENRY J. MILLER.